May 4, 1954 — D. FIRTH — 2,677,283
V-BELT CLUTCH
Filed Sept. 21, 1951 — 3 Sheets-Sheet 1

INVENTOR.
David Firth,
BY Osgood H. Dowell
Atty.

May 4, 1954  D. FIRTH  2,677,283
V-BELT CLUTCH
Filed Sept. 21, 1951  3 Sheets-Sheet 2
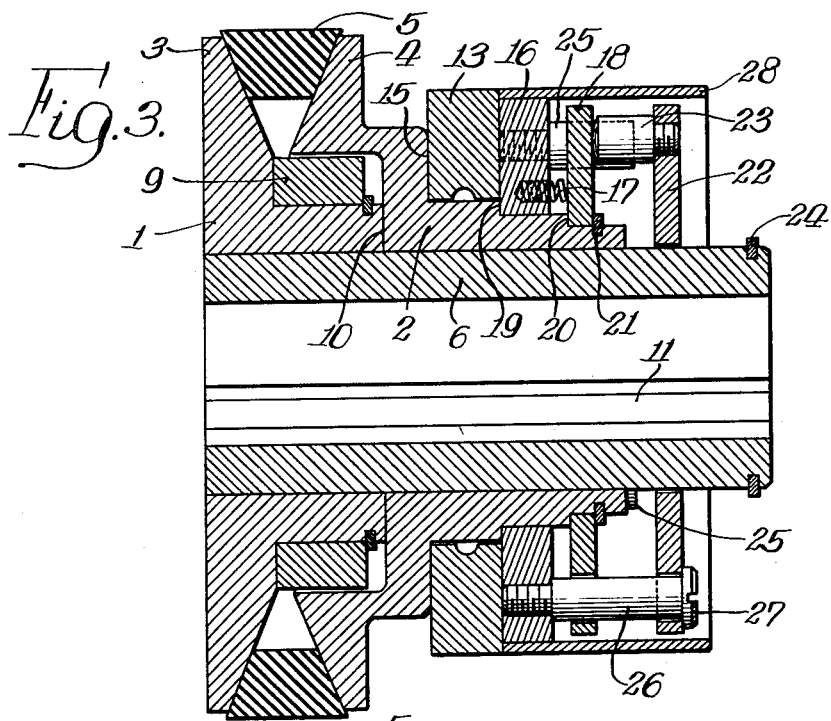
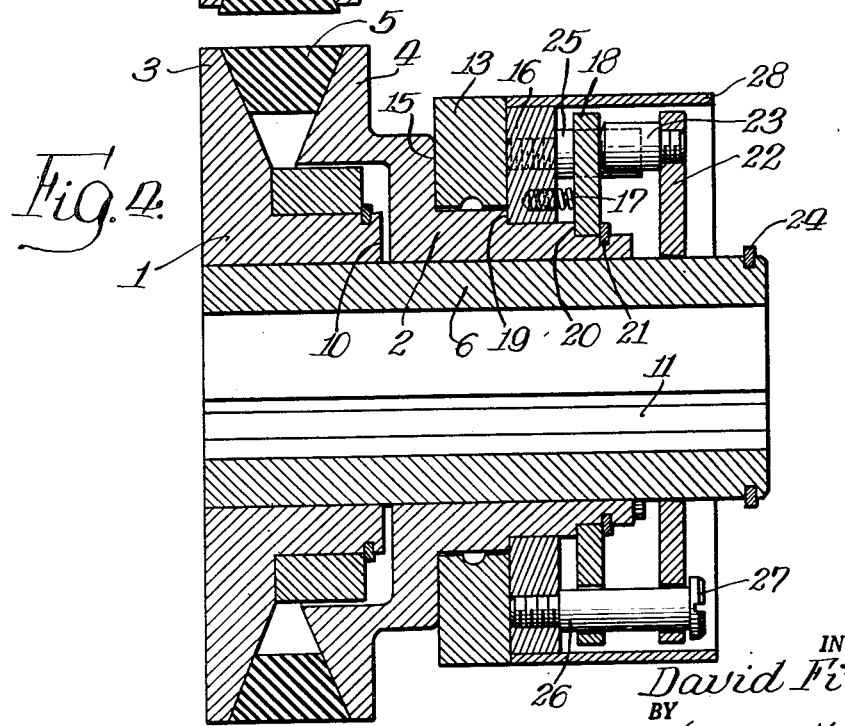
INVENTOR.
David Firth,
BY Osgood H. Dowell
Atty.

May 4, 1954 D. FIRTH 2,677,283
V-BELT CLUTCH
Filed Sept. 21, 1951 3 Sheets-Sheet 3

INVENTOR.
David Firth,
BY Osgood H. Dowell
Atty.

Patented May 4, 1954

2,677,283

UNITED STATES PATENT OFFICE 2,677,283

V-BELT CLUTCH

David Firth, South Bend, Ind., assignor to Dodge Manufacturing Corporation, Mishawaka, Ind., a corporation of Indiana Application September 21, 1951, Serial No. 247,571

24 Claims. (Cl. 74—230.17)

The type of device known as a V-belt clutch is a sheave comprising relatively axially movable sections and mechanism operable under running conditions for causing them alternately to clutch and release an interposed V-type belt.

The present invention provides a sheave of said type having novel mechanism for alternately establishing and disestablishing driving relationship of the sheave sections, which relationship may be varied for driving at different effective sheave diameters.

For releasably locking the axially shiftable sheave section in driving relation to the opposing section, the invention utilizes a locking means of a type employed in a V-belt clutching sheave disclosed in my co-pending application Serial No. 218,043, filed March 28, 1951 (Patent No. 2,634,620, dated April 14, 1953), but in a specifically different organization. A sheave in accordance with the present invention is not only useful for the same purpose as that of said co-pending application, but also has certain advantages over the other, as hereinafter indicated.

Objects of the invention include the provision of such novel features and subjects-matter as are embodied in the illustrative structure hereinafter described.

In the sense of this specification, a driving relationship of the sheave sections is one in which the belt is engaged by said sections for transmission of power to or from the sheave. The expression "under running conditions" means while the belt is driving or being driven by the sheave, or while either the belt or sheave is running without transmission of power to the other due to a release condition of the sheave.

A sheave embodying the invention in one practicable form is shown for illustration in the accompanying drawings.

Figure 2:
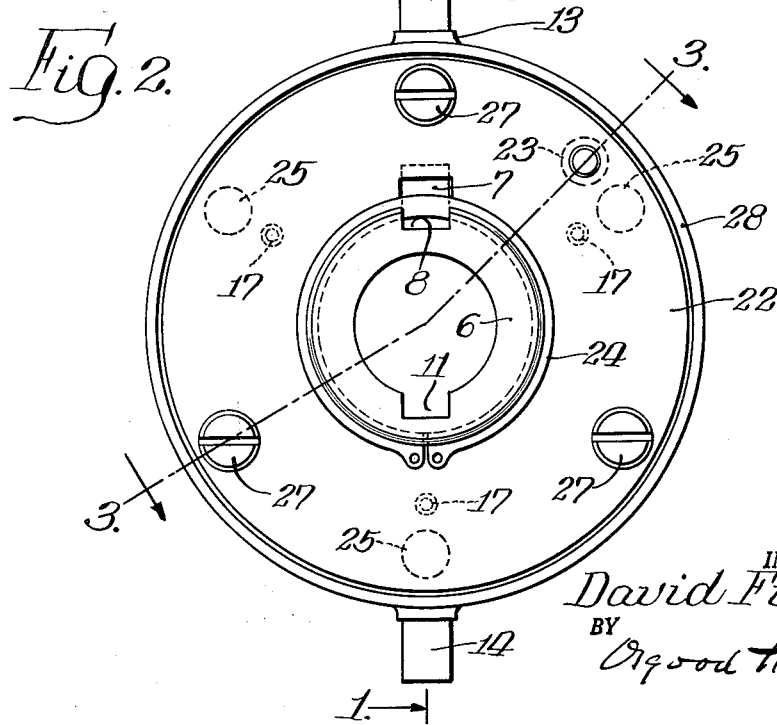
Fig. 2 is a rear end elevation of the sheave.

Fig. 3 is a longitudinal section taken on the line 3—3 of Fig. 2, showing the relative positions of the sheave parts at the instant when the axially shiftable sheave section is moved by the shifter to its extreme forward position, which is slightly beyond the maximum diameter driving position, thereby forcing the belt outwardly in the sheave to a position such that its outer surface protrudes somewhat beyond the peripheries of the friction faces of the sheave sections.

Fig. 4 is a longitudinal section of the sheave taken on said line 3—3 of Fig. 2, showing the sheave in a so-called maximum diameter driving condition, the axially shiftable section being locked to hold the belt in the outermost position which it can assume in the sheave without protrusion beyond the friction faces aforesaid.

Figure 5:
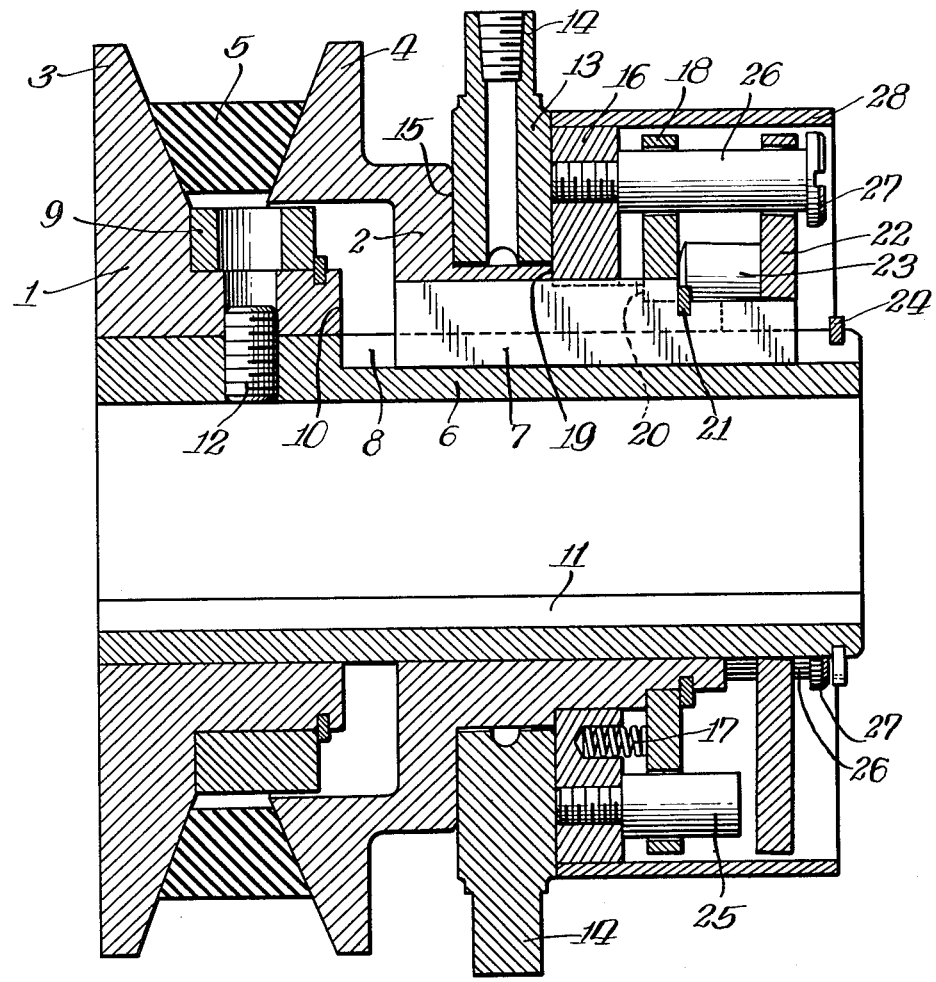

Fig. 5 is a longitudinal section of the sheave taken on the line 1—1 of Fig. 2, showing the sheave locked in condition for driving at approximately minimum effective diameter, this figure being on a larger scale than the preceding figures.

Figure 1:
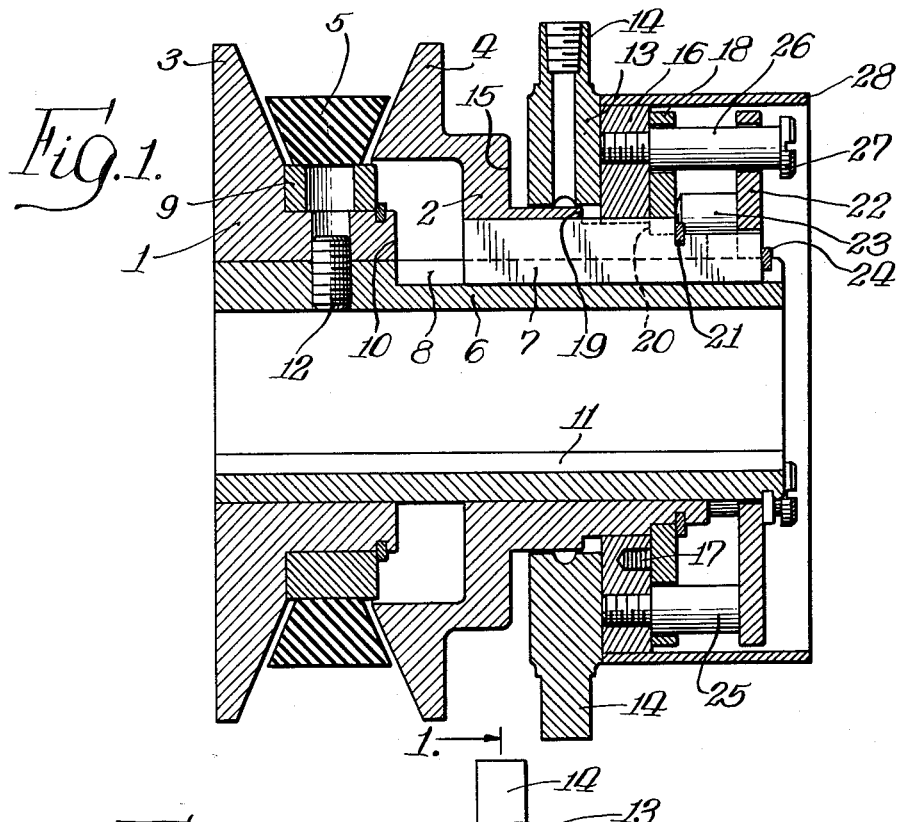
Fig. 1 is a longitudinal section of the illustrative sheave taken on the line 1—1 of Fig. 2, showing the sheave in release condition, more particularly at the instant when the several axially movable parts are in their extreme rearward positions.
Figure 6:
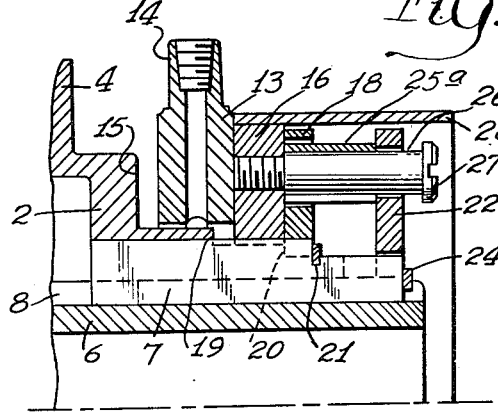

Fig. 6 is a portion of a longitudinal section corresponding to Fig. 1 of a sheave identical to that shown in the preceding figures except for a modified form of push means for straightening and pushing back the locking washer on retractive movement of the shifter collar.

Referring to the drawings, the illustrative sheave comprises coaxial annular sections 1 and 2 formed with flanges 3 and 4 having confronting conical faces for tractive engagement with the opposite sides of an interposed V-type belt, the section 2 being shiftable axially toward and away from the other for clutching and release of the belt.

The sheave section 1 is fixed on a hub 6 which extends through and carries the section 2, the latter being slidable on said hub but held from rotative movement relative thereto by a key 7. The key shown slides in a keyway 8 in the hub, said key being held in fixed relation to and movable with the slidable section 2.

When the sheave is in a release condition, as for example in Fig. 1, the belt being disengaged from the sheave flanges runs idly on a freely rotatable ring 9 mounted under or within the belt on a central hub extension of the fixed section 1. The flange-carrying fore portion of the slidable section 2 is recessed to enclose said ring and extension, without contact with said ring, when the sheave is in driving condition, as for instance in Fig. 4 or Fig. 5. In lieu of the ring 9, there could be substituted a similarly mounted annular antifriction bearing unit comprising caged balls or rollers on which to support the belt for idle running between the sheave flanges when disengaged therefrom. The rear end face 10 of member 1 provides a stop for limiting movement of the slidable sheave section 2 forwardly or toward the section 1.

The hub 6, providing a central support for the sheave sections, is shown as a sleeve to be fitted on and keyed to the shaft to which the sheave is to be applied. An internal keyway in the hub for engagement by a shaft key is indicated at 11.

The hub may be held from axial displacement relative to the shaft by a set screw 12 in threaded engagement with the hub and adapted to be tightened against the shaft, said screw being insertible through registering holes therefor in the ring 9 and section 1. Said section 1 may be integral with the hub 6 but is preferably made as a separate part which may be pressed on or keyed and pinned to said hub or otherwise fixed thereto in driving connection therewith.

Mounted on the slidable section 2 is a swiveled shifter collar 13 movable axially a limited distance relative to said section, whereby movement of said section in opposite directions by the collar requires taking up a lost motion in either direction. Any suitable shifting means may be operatively connected with said collar for shifting it as required for moving the section 2 to and from belt-clutching positions. As shown, the collar is formed with diametrically opposite trunnions 14 for engagement by the yoke arms of a shifting yoke or lever (not shown).

By forward shifting of the collar 13 from a retracted position, the slidable sheave section 2 can be forced against the belt to any desired position such that the belt, being gripped by and between the friction faces of the sheave flanges, will move outwardly and assume a position in the sheave determined by the spacing of said friction faces at the moment when forward movement of said collar ceases. Upon release of forward pressure on the shifting means, the belt will move inwardly, pushing said section 2 backward to cause canting of a locking washer hereinafter referred to.

The belt 5 is preferably of such width that when the slidable section 2 is in its extreme forward position, abutting the face 10 of the section 1, the belt will protrude slightly beyond the peripheries of the friction faces of the sheave flanges, as shown in Fig. 3. Fig. 4 shows the sheave in its so-called maximum diameter driving condition, the slidable section 2 having been locked in such relation to the opposing section that the belt is held in the outermost position which it can assume without protrusion from the peripheries of said friction faces. Fig. 5 shows the sheave in approximately minimum diameter driving condition.

The shifter collar 13 is rotatably and slidably fitted on the section 2 behind the shoulder 15 thereof, and works as a slip ring between said shoulder and an annulus 16 slidable on said section and spring-pressed forwardly relative thereto. Said collar and annulus are movable axially in abutting relation a limited distance relative to 2. Rearward movement thereof relative to said section may be limited by any suitable means. In this instance such rearward movement is limited by an abutment member shown as a disc 18 fixed on said section 2. The annulus 16 is urged forwardly relative to 2 by springs 17 seated in recesses therefor in said annulus and reacting against the disc 18. As the collar is shifted forwardly, the springs force the annulus to follow it. When the collar abuts the shoulder 15, the annulus is held by the springs in its foremost position relative to 2. On retractive shifting of said collar, it forces said annulus to its rearmost position relative to 2, whereupon continued backward movement of the collar is transmitted to the section 2 by said annulus and disc.

In the illustrative structure, the slidable sheave section 2 is exteriorly stepped or of different outside diameters to form the successive rearwardly facing shoulders 15, 19 and 20, the shifter collar 13 being fitted on the portion of said section between 15 and 19, and the annulus 16 being fitted on the portion of said section between 19 and 20, while the disc 18 is fitted on said section against the shoulder 20 and held in place by a snap ring 21 sprung into an annular groove in said section. The collar 13, annulus 16 and disc 18 are all held from rotative movement relative to the sheave hub by the previously mentioned key 7 slidable in the hub groove 8 and engaging in keyways therefor in said collar, annulus and disc, said key being held in fixed relation to the sliding section 2 by the snap ring 21.

The longitudinal thickness of the annulus 16 is substantially and materially less than the distance from 19 to 20. The longitudinal thickness of the shifter collar 13 is no greater than the distance from 15 to 19, so as to allow said annulus to abut the shoulder 19 when the shifter collar is pushed against the shoulder 15. Said collar is preferably of slightly less thickness than the distance from 15 to 19, so that when the annulus 16 abuts the shoulder 19 the collar 13 will have a free slip fit between 15 and 16 and the annulus will not be pushing against the collar.

The springs 17 should exert sufficient force to hold the annulus 16 firmly against the shoulder 19 and to prevent backward movement of said annulus relative to 2 except by a forced retractive movement of the shifter collar; so that in driving operations there will be no jarring of said annulus from said shoulder by vibration of the shifter collar or by shaft vibration.

The extent of material lost motion between the shifter collar 13 and the sliding sheave section 2 is the distance which the annulus 16 can move axially relative to said section. The actual lost motion may be greater, since, as just stated, the shifter collar is preferably of less thickness than the distance from 15 to 19. Only the material lost motion need be considered, which in the illustrative structure is substantially the distance from 19 to 16 in Fig. 1 and from 16 to 18 in Figs. 3, 4 and 5.

Slidably fitted on the hub 6 behind the slidable sheave section 2 is a locking washer 22 which by means hereinafter described is moved forward and backward with said section. Said washer, normally substantially erect on the hub, is adapted to be canted to grip the hub. The washer is preferably of such thickness and bore that a very slight canting thereof will bring its inside edges at opposite ends of its bore into engagement with opposite sides of the hub. In the illustrative structure, said washer has fixed thereto a forwardly projecting stud 23 having a preferably rounded end in contact or near contact with the disc 18. As an alternative arrangement, said stud, instead of being carried by the washer, may be fixed in a reverse position to said disc to extend rearwardly therefrom and contact with the washer. The stud 23 is so eccentrically located that back thrust thereon will cause it to cant the washer. One of the functions of the disc 18 is to transmit to said stud back movement of the slidable section 2 by back pressure of the belt thereagainst when said section has been forced by the shifter collar to a clutching position and forward pressure on said collar has been released. Such back movement continues until the washer is forced into tight gripping engagement with the hub, thereby locking said slidable section in driving relation to the opposing section.

Said locking washer 22 is preferably splined to the sheave hub by the key 7, which as shown in Fig. 1 extends rearwardly beyond the rear end of the slidable sheave section 2 and fits slidably in a keyway therefor in said washer. Rearward movement of the washer may be limited by a snap ring 24 sprung into an annular groove in the hub. By limiting rearward movement of the washer, said snap ring also limits rearward movement of the slidable section 2 and parts carried thereby, since in Fig. 1 the key 7 in its rearmost position abuts said snap ring, and, even if the rearward extension of said key were omitted, the construction shown is such that in Fig. 1 the annulus 16 is prevented from back movement by abutment of push pins 25 against the washer and the section 2 could not move back relative thereto a greater distance than to take up the clearance between 19 and 16.

For moving the locking washer forward and backward with the slidable sheave section 2, the annulus 16 is connected with the washer by push and pull means in a manner allowing a limited movement of the annulus relative to the washer, preferably for a distance substantially equal to that which the annulus is movable relative to said slidable section, these distances being appropriate to allow canting of the washer as hereinbefore described and to allow on retractive shifting of the collar 13 release of the washer from gripping engagement with the hub before back movement of said collar is imparted to said slidable section.

The specific push and pull means provided in the illustrative structure comprises a plurality of push pins 25 of equal lengths fixed to and extending rearwardly from the annulus 16, and a plurality of considerably longer pull pins 26 fixed to and extending rearwardly from said annulus and having mushroom heads 27, the locking washer 22 being arranged between said push pins and the heads of said pull pins. There is also shown fixed to said annulus a casing 28 enclosing said pins and associated parts. Each set of pins may be of any suitable number and arrangement. Preferably each set comprises three uniformly angularly spaced pins. As shown, the several pins pass loosely through holes therefor in the disc 18 and the pull pins pass loosely through holes therefor in the locking washer, the last mentioned holes being of sufficient diameter to allow canting of the washer. As the locking washer is splined to the hub by the key 7, the pull pins 26 are relieved from the duty of holding it from rotative movement relative to the hub, and from lateral pressure and friction that would be incident to such a duty.

The relative lengths of the push pins and pull pins are such that when the push pins 25 abut the locking washer 22, as in Fig 1, the pull pin heads 27 are spaced from the washer a distance preferably equal to that which the annulus 16 is movable relative to the slidable section 2, and when the pull pin heads abut the washer, as in Fig 3, the push pins are spaced therefrom a like distance. This distance should be such that when the parts carried by the slidable section 2 are in the relationship thereto shown in Fig. 3, the push pins 25 are sufficiently spaced from the washer to allow canting thereof to locking or tight hub-gripping position by back movement of said slidable section by back pressure of the belt. In the canting operation, all parts carried by said slidable section, in the relationship thereto shown in Fig. 3, move back with said section. Thus the push pins 25 move back therewith, while the portion of the washer diametrically opposite the stud 23 is moved forwardly by the canting of the washer. This results in substantially decreasing the distance between the plane of the rear end faces of the push pins and the peripheral portion of the washer diametrically opposite said stud. The clearance between the push pins and locking washer in Fig. 3 must therefore be greater than or at least as great as the decrease in said distance. For example, if said clearance be $\frac{3}{16}''$, and if canting of the washer to tight hub-gripping position is effected by a backward movement of the section 2 a distance of $\frac{1}{8}''$, then said clearance is enough, since the decrease in said distance between said plane and said peripheral portion of the washer would be about or possibly more than $\frac{1}{8}''$ but less than the original clearance of $\frac{3}{16}''$.

In lieu of the specific push pins and pull pins described, any suitable equivalents thereof may be employed. For example, the functions of the two sets of pins may be performed by a single set of pins, e. g. by the pull pins if formed or provided with thrust-transmitting shoulders or flanges appropriately spaced from the pull pin heads to serve in place of a separate set of push pins. Again, the push pins may be in the form of tubular struts or sleeves slidably fitted on the pull pins and in the disc 18 and of appropriate lengths to abut the annulus 16 and locking washer 22 when said annulus is in its rearmost position relative to the sliding section 2.

In the structure shown in Figures 1 through 5, the length of the washer stud 23 from its tip to the front face of the locking washer 22 is preferably substantially equal to the distance which the push pins 25 project from the disc 18 when the pin-carrying annulus 16 is in its rearmost position relative to the slidable sheave section 2 (Fig. 1). As the rearward movement of said annulus relative to 2 is limited in this instance by abutment of said annulus against the disc 18, the washer stud in the illustrative structure is of a length substantially equal to that of said push pins minus the thickness of said disc. As said annulus 16 and pins carried thereby move back and forth as a unit the same distance relative to the locking washer that they move relative to said section 2, the washer stud 23, being of the preferred length indicated, is in contact with the disc 18 both when the several push pins abut the washer, as in Fig. 1, and when the several pull pin heads abut the washer, as in Fig 3. This desirable condition minimizes the distance which the slidable sheave section 2 must move backward for canting the washer. Canting of the washer to locking position may be effected in many embodiments of the invention by a backward movement of said section 2 a distance of only about $\frac{1}{16}''$, and even as little as about $\frac{1}{32}''$ in sheaves of small sizes, e. g. sheaves of diameters of from three to five inches.

For every embodiment of the invention, there is a definite optimum length for the stud 23. In embodiments in which the annulus 16 moves relative to the slidable section 2 a distance either the same as or no greater than that which it moves relative to the locking washer 22, the optimum stud length is as hereinbefore indicated, i. e. substantially equal to the distance which the push pins 25 project from the disc 18 when the several said pins abut the washer, said annulus being then in its rearmost position relative to said slidable section. In embodiments in which the movement of said annulus relative to said section exceeds its movement relative to the locking washer, the optimum length for the stud 23 is substantially equal to the distance between said washer and disc 18 when the washer has been brought to its extreme forward position relative to said slidable section.

Though the stud 23 may be slightly longer than the optimum length, it should not be so unduly long as to prevent straightening the canted washer on retractive shifting of the shifter collar and moving the washer back and forth on the hub by the push pins and pull pins. A very slight increase in the relative length of said stud would not be objectionable, since it would be partly compensated by the fact that when the washer is canted the horizontal distance from its front face to the point of contact of said stud with the disc 18 is less than the length of said stud, and in the unlocking or releasing operation the push pins 25 would project rearwardly from 18 a distance so very nearly equal to the length of the stud that said pins could straighten the canted washer sufficiently to be pushed back by said pins, or by said pins and stud, as the slidable section 2 and disc 18 move rearwardly. The amount which the stud length may exceed the optimum varies from about 1/64" to 1/32" in small diameter sheaves to about 1/16" or more in sheaves of larger diameter. If a stud length in excess of the optimum is without objectionable effect, the amount which such stud length exceeds the optimum may be regarded as immaterial.

The stud 23 may be of less than optimum length, though there would ordinarily be no advantage in shortening it, since decreasing its relative length would correspondingly increase the distance which the slidable section 2 must move backward to cant the locking washer. So also increasing the relative length of the pull pins would correspondingly increase the distance which said section must move backward to cant the washer. On the other hand, decreasing the relative length of the pull pins 26, with corresponding decrease in the length of the stud 23, will not increase the back movement of said section required for canting the washer.

*Operation*

The operation of the illustrative device is substantially as follows:

On forward shifting of the shifter collar 13 from the retracted position shown in Fig. 1, the springs 17 force the pin-carrying annulus 16 to its foremost position relative to the slidable section 2, thereby bringing the pull pin heads 27 into contact with the locking washer 22 and moving the push pins 25 away from the washer. Thus as lost motion is taken up, the parts carried by said slidable section and the locking washer assume a relationship to said section substantially as shown in Fig. 3, and in that relationship, maintained by said springs, move forwardly as a unit with said section. When said section is forced against the belt 5 to a position to effect clutching, and forward pressure on the shifter collar is released, the back pressure of the belt against said section pushes it backward, while the belt moves inwardly. The back movement of said section by the belt is transmitted by the shifter collar and annulus 16 to the push pins and pull pins, which thus move backward with said section relative to the locking washer, while the disc 18, fixed on said section, pushes against the stud 23, thereby canting the washer to a position in tight gripping engagement with the hub 6, and thus locking said section in driving relation to the opposing section 1. The canted washer, sustaining back pressure of the belt against said slidable section, holds it from back movement until a release action is caused by retractive movement of the shifter collar. On retractive shifting of said collar, it forces the pin-carrying annulus to its rearmost position relative to said slidable section before transmitting movement to said section by the disc 18. As said annulus moves rearwardly relative to said sheave section, the push pins move against and straighten the locking washer, thus releasing it from gripping engagement with the hub before backward movement of said section begins. Thereupon said slidable section, together with the parts carried thereby and the locking washer, all in a relationship such as shown in Fig. 1, moves back with said section to disengage the sheave flanges from the belt, allowing it to run idly on the freely rotatable ring 9.

It will be observed that the annulus 16 functions as a spacing washer between 13 and 18, as well as a slide to carry the pins 25 and 26 in parallelism with the sheave hub, and that the disc 18, serving as an abutment for the springs 17 and a back stop for the pin-carrying annulus, also functions twice as a thrust-transmitting member, first to transmit back pressure of the slidable section 2 to the stud 23 for canting the locking washer; and, second, to transmit backward movement of the shifter collar 13 to the slidable section 2 after the taking up of lost motion as said collar is shifted rearwardly.

Under some conditions, if only a light effort is required to move the shifter collar 13 from the position shown in Fig. 1 to a position against the abutment face 15, and if the force of the springs 17 is sufficient for that effort, then in the release condition of the sheave, unless said collar is held in retracted position by the shifting yoke or lever, the several movable parts of the sheave may assume a relationship such as shown in Fig. 3 immediately after backward pressure on the shifter collar is released, and on forward shifting of said collar the said parts, being already in said relationship, will simply move forward in said relationship as a unit until the slidable section 2 is forced to a position for clutching the belt. This does not affect the described operation except that the assumption of said relationship of movable parts may take place before forward shifting of the shifter collar by the shifting means begins.

If the pull pins 26 were relatively lengthened, so that the movement of the annulus 16 and pin assembly relative to the locking washer would exceed the movement thereof relative to the slidable section 2, then on forward shifting of the shifter collar the pull pin heads 27 would be brought into contact with the locking washer partly by forward movement of 16 relative to 2 and partly by ensuing forward movement of 2 relative to 22, so that forward movement of said washer would begin after forward movement of said slidable section begins; otherwise the operation would be substantially as hereinbefore described. However, in this instance, the distance which the section 2 must move backward to cant the locking washer would be increased by the difference between the distances which the pin assembly moves relative to said section and relative to the locking washer.

Assume, for example, that the annulus 16 moves $\frac{3}{16}''$ relative to the section 2 and $\frac{1}{4}''$ relative to the locking washer; that the stud 23 is of optimum length, i. e. equal to the distance which the push pins 25 project from 18 when said pins abut the washer; and that canting of the washer to locking position is effected by a backward movement of $\frac{1}{16}''$ of the section 2 while the disc 18 abuts said stud. When the pull pin heads 27 are brought into contact with the washer, the section 2 has moved forward $\frac{1}{16}''$ and the push pins have become spaced $\frac{1}{4}''$ from the washer. In the locking operation, the section 2 moves back $\frac{1}{16}''$ to bring the disc 18 into contact with the stud 23 and $\frac{1}{16}''$ more to cant the washer, so that the distance between the plane of the rear faces of the push pins and the peripheral portion of the washer diametrically opposite said stud is decreased by about or nearly $\frac{3}{16}''$. On retractive shifting of the shifter collar, the push pins move back $\frac{3}{16}''$ before backward movement of the section 2 begins, thus straightening the washer for backward movement with the slidable section 2.

If the illustrative structure were modified by increasing the distance which the annulus 16 is movable relative to 2, and correspondingly decreasing the length of the washer stud 23, then the forward movement of 16 relative to 2 would move the pull pin heads 27 forward a like distance, in which movement said heads would strike the locking washer and commence to move it forward before forward movement of 2 begins; otherwise the operation would be substantially as that of the illustrative device. Assume, for example, that the annulus 16 moves $\frac{1}{4}''$ relative to 2 and $\frac{3}{16}''$ relative to the locking washer; that the stud 23 is $\frac{1}{16}''$ shorter than the distance which the push pins 25 project from 18 when said heads abut the washer, and that canting of the washer is effected by a backward movement of $\frac{1}{16}''$ of the section 2 while the disc 18 abuts said stud 23. Under these conditions, when on forward shifting of the shifter collar the annulus 16 reaches its foremost position relative to 2, the locking washer has been moved forward $\frac{1}{16}''$ relative to 2, and is now in its foremost position relative to 2, the shortened washer stud being in contact with disc 18 and the push pins 25 being spaced $\frac{3}{16}''$ from the washer. In the locking operation, the section 2 moves backward $\frac{1}{16}''$ to cant the washer, and the distance between the plane of rear end faces of the push pins and the peripheral portion of the washer diametrically opposite the stud 23 is decreased by about $\frac{1}{8}''$. On retractive shifting of the shifter collar, the push pins move backward $\frac{1}{4}''$ relative to 2, thus straightening the canted washer and pushing it back about $\frac{1}{8}''$ before backward movement of 2 begins.

As appears from the foregoing, the relative lengths of the push pins, pull pins and washer stud, and the distances which the pin assembly is movable relative to the slidable section 2 and relative to the locking washer, may be varied in different embodiments of the invention. Said distances, which may be equal or unequal in different structures, may range from about $\frac{1}{8}''$ in small diameter sheaves to $\frac{3}{8}''$ or more in larger diameter sheaves.

It will be understood that the distance which the slidable section 2 of the illustrative sheave is movable from the retracted position shown in Fig. 1 to a position to effect engagement of the belt by the sheave flanges is substantially greater than the lost motion to be taken up in operation, and that in any embodiment of the invention the slidable sheave section should be retractible to a position such that its forward movement therefrom to a position to effect engagement of the belt by the sheave flanges is greater than said lost motion, i. e. greater than the distance which the annulus 16 is movable relative to said section, and greater than the distance which said annulus is movable relative to the locking washer if that distance exceeds the other.

The sheave partially shown in Fig. 6 is identical to that shown in the preceding figures except that, in lieu of the push pins 25, the sheave of Fig. 6 employs push pins comprising sleeves 25a slidably fitted on the respective pull pins 26 and abutting the annulus 16 and locking washer 22 when said annulus is in its rearmost position relative to the slidable section 2.

The present invention accomplishes by novel means the purposes of the invention disclosed in my co-pending application hereinbefore mentioned and has certain advantages over the latter. By locating the shifter collar and associated spring-pressed annulus on the slidable sheave section, instead of carrying the collar on a shifter sleeve slidable on the hub behind said section, the present invention makes it possible to shorten the overall length of the sheave. Further it obviates need of detent means such as disclosed in said copending application for holding the shifter sleeve thereof from displacement by shaft vibration. Also it utilizes the push pins and pull pins only on the relatively light duty of straightening the locking washer and moving it along the hub with the slidable sheave section.

In the appended claims, the term "central support" is applicable either to a shaft on which the sheave sections are directly mounted, or to a hub to be mounted on such shaft in driving connection therewith.

I claim:

1. A sheave of the class described comprising sections having confronting faces for tractive engagement with the opposite sides of an interposed V-type belt, said sections being relatively movable axially for alternately clutching and releasing the belt, a central support on which one of said sections is fixed and the other slidable, a shifter collar swiveled to said slidable section in a manner allowing a limited axial movement of said collar relative to said slidable section, whereby movement of said slidable section in opposite directions by said collar requires taking up a lost motion in each direction, a locking washer slidably fitted on said support behind said slidable section and adapted to be canted to grip said support, means operable on forward shifting of said collar after the taking up of lost motion to move said washer forwardly with said slidable section, means operable by back pressure of the belt against said slidable section for canting said washer when said slidable section has been forced by the collar to a clutching position and forward pressure on the collar has been released, said washer in its canted position sustaining said back pressure and thereby locking said slidable section in driving relation to the opposing section, and means operable by retractive shifting of said collar to straighten the washer during the taking up of lost motion and then moving it rearwardly with said slidable section.

2. A sheave of the class described comprising sections having confronting faces for tractive engagement with the opposite sides of an interposed V-type belt, said sections being relatively movable axially for alternately clutching and releasing the belt, a central support on which one of said sections is fixed and the other slidable, a shifter collar mounted on said slidable section in a manner allowing a limited axial movement of said collar relative to said slidable section, whereby movement of said slidable section in opposite directions by said collar requires taking up a lost motion in each direction, a locking washer slidably fitted on said support behind said slidable section and adapted to be canted to grip said support, means movable axially with said collar and having a lost motion connection with said washer for moving it forwardly and rearwardly with said slidable section, said slidable section having fixed thereon behind said collar an abutment in proximity to said washer, and a stud between said abutment and washer fixed to one of them and adapted to bear against the other, whereby upon release of forward pressure on the shifter collar when it has forced said slidable section to a clutching position back movement of said slidable section by back pressure of the belt thereagainst will cause canting of said washer by back thrust of said stud thereagainst, thereby locking said slidable section in driving relation to the opposing section, said means for moving said washer forwardly and rearwardly with said slidable section being effective on retractive shifting of said collar to release the washer from gripping engagement with said support before backward movement of said collar is imparted to said slidable section.

3. A sheave of the class described comprising sections having confronting faces for tractive engagement with the opposite sides of an interposed V-type belt, said sections being relatively movable axially for alternately clutching and releasing the belt, a central support on which one of said sections is fixed and the other slidable, a shifter collar slidably fitted on said slidable section, an annulus slidably fitted on said slidable section and movable axially relative thereto with and in abutting relation to said collar, said annulus being behind said collar, means limiting forward movement of said collar relative to said slidable section, means limiting rearward movement of said annulus relative to said slidable section, spring means for urging said annulus to its foremost position relative to said slidable section, said annulus being movable to its rearmost position relative to said slidable section by said collar, a locking washer slidably fitted on said support behind said slidable section and adapted to be canted to grip said support, means connecting said annulus and washer in a manner permitting a limited movement in either direction of said annulus relative to said washer, whereby to move said washer forwardly and backwardly with said slidable section, and means operable by back pressure of the belt against said slidable section, when it has been forced to a clutching position and forward pressure on the shifter collar has been released, for canting said washer and thereby locking said slidable section in driving relation to the opposing section, said connecting means between said annulus and washer being effective on retractive shifting of said collar to release said washer from gripping engagement with said support before backward movement of said collar is imparted to said slidable section.

4. A V-belt clutching sheave according to claim 3 having a shoulder on said slidable section constituting the said means for limiting forward movement of said collar relative to said section, and having a separate means for so limiting forward movement of said annulus relative to said slidable section that when the annulus is spring-pressed to its foremost position relative to said slidable section the collar has a slip fit between said shoulder and annulus, the annulus when in its said foremost position being spaced from said shoulder a slightly greater distance than the thickness of said collar.

5. A V-belt clutching sheave according to claim 3 wherein said slidable section has a shoulder constituting the said means for limiting forward movement of said collar relative to said section, and wherein the portion of said section on which said annulus is fitted is of less diameter than the portion on which said collar is fitted, thereby providing a second shoulder for limiting forward movement of said annulus relative to said slidable section, said second shoulder being spaced from the first a distance slightly greater than the thickness of said collar which thus has a slip fit between said first shoulder and spring-pressed annulus when the latter is in its foremost position relative to said slidable section.

6. A V-belt clutching sheave according to claim 3 wherein said slidable section is successively reduced in diameter to form three rearwardly facing shoulders the first of which constitutes the said means for limiting forward movement of said collar relative to said slidable section and the second of which limits forward movement of said annulus relative to said slidable section, there being a thrust-transmitting member fitted on the rear portion of said slidable section and held against the third shoulder by a snap ring, and a key movable with said slidable section and slidable in a keyway therefor in said central support keying said section, annulus and member to said support, said key fitting in grooves therefor in said slidable section, annulus and member and held in fixed relation to said slidable section by said snap ring.

7. A V-belt clutching sheave according to claim 3 wherein the means for canting the locking washer comprises a thrust-transmitting member fixed on said slidable section behind said annulus and a stud between said member and washer fixed to one of them and cooperable with the other for transmitting back movement of and back pressure against said slidable section to said washer in a manner to cant and hold it in gripping engagement with said support.

8. A V-belt clutch according to claim 3 wherein said means connecting said annulus and washer comprises means behind said washer carried by and in fixed relation to said annulus to move against the washer and then to move it forwardly with said slidable section on forward shifting of said collar and means in front of said washer in fixed relation to said annulus to move against, straighten and push back the washer with said slidable section on retractive shifting of said collar, said last named means being in appropriate spaced relation to said means behind the washer to allow the canting operation aforesaid and to cause on retractive shifting of the collar release of the washer from locking position before backward movement of said collar is imparted to said slidable section.

9. A V-belt clutching sheave according to claim 3 wherein said means connecting said annulus and washer comprises a plurality of angularly spaced pull pins and a plurality of angularly spaced pushers, said pull pins connecting said annulus and washer in a manner to limit their relative movement away from each other, and said pushers being arranged between and carried by one of said annulus and washer for limiting their relative movement toward each other.

10. A V-belt clutching sheave according to claim 3 wherein said means connecting said annulus and washer comprises a plurality of angularly spaced pull pins and a plurality of angularly spaced pushers, said pull pins being fixed to said annulus and extending loosely through said washer and having heads behind the washer, said pushers consisting of sleeves slidably fitted on said pull pins and adapted to abut said annulus and washer when the annulus is in its rearmost position relative to said slidable section, the relative lengths of said pull pins and sleeves being such that the heads of said pull pins are spaced a substantial and material distance from the washer when said sleeves abut the annulus and washer.

11. A sheave of the class described comprising sections having confronting faces for tractive engagement with the opposite sides of an interposed V-type belt, said sections being relatively movable axially for alternately clutching and releasing the belt, a central support on which one of said sections is fixed and the other slidable, a shifter collar slidably fitted on said slidable section, an annulus slidably fitted on said slidable section behind said collar and movable axially therewith in abutting relation thereto, said annulus being movable axially relative to said slidable section only a limited distance in either direction and spring-urged to its foremost position relative to said slidable section and movable by the collar to its rearmost position relative to said slidable section, said slidable section having a shoulder in front of said collar limiting its forward movement relative to said slidable section, said annulus in its said foremost position being spaced a slightly greater distance from said shoulder than the thickness of said collar which thus has a slip fit between said shoulder and annulus when the latter is in its said foremost position, a locking washer slidably fitted on said support behind said slidable section and adapted to be canted to grip said support, means behind said washer carried by and in fixed relation to said annulus to move against the washer and then to move it forwardly with said slidable section on forward shifting of said collar, means operable by back pressure of the belt against said slidable section for canting said washer to grip said support when said slidable section has been forced by the collar to a clutching position and forward pressure on said collar has been released, and means in front of said washer carried by and in fixed relation to said annulus to move against, straighten and push back said washer with said slidable section on retractive shifting of said collar, said last named means being in appropriately spaced relation to said means behind the washer to allow the canting operation aforesaid and to cause on retractive shifting of the collar release of the washer from locking position before backward movement of the collar is imparted to said sliding section.

12. A sheave of the class described comprising sections having confronting faces for tractive engagement with the opposite sides of an interposed V-type belt, said sections being relatively movable axially for alternately clutching and releasing the belt, a central support on which one of said sections is fixed and the other slidable, a shifter collar slidably fitted on said slidable section, an annulus behind said collar slidably fitted on said slidable section and movable axially relative thereto with and in abutting relation to said collar, said slidable section having a shoulder limiting forward movement of said collar relative to said slidable section, a thrust-transmitting member fixed on said slidable section behind said annulus, said member being spaced from said shoulder a distance substantially and materially greater than the combined longitudinal thicknesses of said collar and annulus, spring means acting between said member and annulus for urging the annulus to its foremost position relative to said slidable section, said member limiting rearward movement of said annulus relative to said slidable section, the annulus being movable to its rearmost position relative to said slidable section by said collar, a locking washer slidably fitted on said support behind said slidable section and adapted to be canted to grip said support, a plurality of angularly spaced pull pins fixed to and extending rearwardly from said annulus and passing loosely through said washer and having heads behind the washer spaced substantially equidistantly from said annulus, a plurality of angularly spaced push pins of substantially equal lengths fixed to and extending rearwardly from said annulus and abutting said washer when the annulus is in its rearmost position relative to said slidable section, the relative lengths of said pins being such that when the pull pin heads abut the washer the push pins are sufficiently spaced therefrom for the canting of the washer, a stud between said washer and thrust-transmitting member fixed to one of them and adapted to bear against the other in the canting operation, wherefore upon release of forward pressure on the shifter collar, when it has forced said slidable section to a clutching position, the back pressure of the belt against said slidable section will cause canting of the washer to grip said support by back thrust of said stud against said washer the distance which said annulus is movable axially relative to said slidable section being sufficient to allow on retractive shifting of said collar release of the washer from gripping engagement with said support, by movement of said push pins against the washer, before backward movement of said collar is imparted to said section.

13. A V-belt clutching sheave according to claim 12 wherein the distance which said annulus is movable axially relative to said washer is substantially equal to that which it is movable relative to said slidable section and said stud is of a length not materially greater than and preferably substantially equal to that of said push pins minus the thickness of said member.

14. A V-belt clutching sheave according to claim 12 wherein the distance which said annulus is movable axially relative to said washer exceeds that which it is movable relative to said slidable section and said stud is of a length substantially equal to that of said push pins minus the thickness of said member.

15. A V-belt clutching sheave according to claim 12 wherein the distance which said annulus is movable relative to said slidable section exceeds that which it is movable relative to said washer and said stud is of a length not materially greater than and preferably substantially equal to the distance between said member and washer when the latter is brought by the pull pins to its foremost position relative to said slidable section.

16. A sheave of the class described comprising sections having confronting faces for tractive engagement with the opposite sides of an interposed V-type belt, said sections being relatively movable axially for alternately clutching and releasing the belt, a central support on which one of said sections is fixed and the other slidable, a shifter collar slidably fitted on said slidable section, an annulus behind said collar slidably fitted on said slidable section and movable axially relative thereto with and in abutting relation to said collar, means limiting forward movement of said collar relative to said slidable section, means limiting rearward movement of said annulus relative to said slidable section, spring means for urging said annulus to its foremost position relative to said slidable section, the annulus being movable to its rearmost position relative to said slidable section by said collar, a locking washer slidably fitted on said support behind said slidable section and adapted to be canted to grip said support, means operable by back pressure of the belt against said section for canting said washer to grip said support when said section has been forced to a clutching position and forward pressure on the shifter collar has been released, said means comprising an abutment fixed on said section in proximity to said washer and a stud arranged between said abutment and washer fixed to one of them and cooperable with the other for transmisison of back thrust of said slidable section to the washer, a plurality of angularly spaced pull pins connecting said annulus and washer in a manner allowing relative movement thereof axially but limiting such movement away from each other, means limiting such movement toward each other comprising a plurality of angularly spaced pushers arranged between and carried by one of said annulus and washer for transmitting back movement of said annulus to the washer, the distance which said annulus is movable relative to said washer being such that when the annulus is in its foremost position relative to said slidable section said pushers are sufficiently spaced from the washer to allow the canting operation aforesaid, the distance which said annulus is movable axially relative to said slidable section being sufficient to allow on retractive shifting of said collar release of the washer from gripping engagement with said support, by back movement of said annulus, before backward movement of said collar is imparted to said slidable section.

17. A sheave of the class described comprising sections having confronting faces for tractive engagement with the opposite sides of an interposed V-belt, said sections being relatively movable axially for alternately clutching and releasing the belt, a central support on which one of said sections is fixed and the other slidable, a shifter collar slidably fitted on said slidable section, an annulus slidably fitted on said slidable section behind said collar and movable axially with and in abutting relation to said collar, said annulus being movable axially relative to said slidable section only a limited distance in either direction and spring-urged to its foremost position relative to said slidable section and movable by the collar to its rearmost position relative to said slidable section, means limiting forward movement of said collar relative to said slidable section, a locking washer slidably fitted on said support behind said slidable section and adapted to be canted to grip said support, means behind said washer carried by and in fixed relation to said annulus to move against the washer and then to move it forwardly with said slidable section on forward shifting of said collar, means operable by back pressure of the belt against said slidable section for canting said washer to grip said support when said slidable section has been forced by the collar to a clutching position and forward pressure on said collar has been released, and means in front of said washer carried by and in fixed relation to said annulus to move against, strengthen and push back said washer with said slidable section on retractive shifting of said collar, said last named means being in appropriately spaced relation to said means behind the washer to allow the canting operation aforesaid and to cause on retractive shifting of the collar release of the washer from locking position before backward movement of the collar is imparted to said shiftable member.

18. A sheave of the class described comprising sections having confronting faces for tractive engagement with the opposite sides of an interposed V-belt, said sections being relatively movable axially for alternately clutching and releasing the belt, a central support on which one of said sections is fixed and the other slidable, a shifter collar slidably fitted on said slidable section, an annulus slidably fitted on said slidable section behind said collar and movable axially with and in abutting relation to said collar, said annulus being movable axially relative to said slidable section only a limited distance in either direction and spring-urged to its foremost position relative to said slidable section and movable by the collar to its rearmost position relative to said slidable section, means limiting forward movement of said collar relative to said slidable section, a locking washer slidably fitted on said support behind said slidable section and adapted to be canted to grip said support, a plurality of angularly spaced pull pins connecting said washer and annulus in a manner allowing relative axial movement thereof but limiting such movement away from each other, means operable by back pressure of the belt against said slidable section for canting said washer to grip said support when said slidable section has been forced by the collar to a clutching position and forward pressure on said collar has been released, and a plurality of angularly spaced pushers arranged between and carried by one of said annulus and washer and to limit their relative movement toward each other, the maximum spacing of said annulus and washer allowed by the pull pins being sufficient for the canting operation, the distance which said annulus is movable axially relative to said slidable section being sufficient to allow on retractive shifting of said collar release of the washer from gripping engagement with said support, by back movement of said annulus, before backward movement of said collar is imparted to said slidable section.

19. A sheave of the class described comprising sections having confronting faces for tractive engagement with the opposite sides of an interposed V-belt, said sections being relatively movable axially for alternately clutching and releasing the belt, a central support on which one of said sections is fixed and the other slidable, a shifter collar slidably fitted on said slidable section, an annulus slidably fitted on said slidable section behind said collar and movable axially with and in abutting relation to said collar, said annulus being movable axially relative to said slidable section only a limited distance in either direction and spring-urged to its foremost position relative to said slidable section and movable by the collar to its rearmost position relative to said slidable section, means limiting forward movement of said collar relative to said slidable section, a locking washer slidably fitted on said support behind said slidable section and adapted to be canted to grip said support, means for moving said washer forwardly with said shiftable section after a limited forward movement of said annulus relative to said slidable section, means operable by back pressure of the belt against said slidable section for canting said washer to grip said support when said slidable section has been forced to a clutching position and forward pressure on the shifter collar has been released, said last named means comprising an abutment member fixed to said slidable section and a stud arranged between said member and washer fixed to one of them and adapted to bear against the other in the canting operation, and push means whereby on retractive shifting of said collar the washer is straightened by back movement of said annulus relative to said slidable section and is then pushed backward with said slidable section.

20. A sheave of the class described comprising sections having confronting faces for tractive engagement with the opposite sides of an interposed V-type belt, said sections being relatively movable axially for alternately clutching and releasing the belt, a central support on which one of said sections is fixed and the other slidable, a shifter collar slidably fitted on said slidable section, an annulus behind said collar slidably fitted on said slidable section and movable axially relative thereto with and in abutting relation to said collar, means limiting forward movement of said collar relative to said slidable section, means limiting rearward movement of said annulus relative to said slidable section, spring means for urging said annulus to its foremost position relative to said slidable section, the annulus being movable to its rearmost position relative to said slidable section by said collar, a locking washer slidably fitted on said support behind said slidable section and adapted to be canted to grip said support, means operable by back pressure of the belt against said slidable section for canting said washer to grip said support when said slidable section has been forced to a clutching position and forward pressure on the shifter collar has been released, said means comprising an abutment fixed on said slidable section in proximity to said washer and a stud arranged between said abutment and washer fixed to one of them and cooperable with the other for transmission of back thrust of said slidable section to the washer, a plurality of angularly spaced pull pins connecting said annulus and washer in a manner allowing relative movement thereof axially but limiting such movement away from each other, means limiting such movement toward each other comprising a plurality of angularly spaced pushers arranged between and carried by one of said annulus and washer for transmitting back movement of said annulus to the water, the maximum spacing between said washer and annulus allowed by the pull pins being sufficient for the canting operation aforesaid, the distance which said annulus is movable axially relative to said slidable section being sufficient to allow on retractive shifting of said collar release of the washer from gripping engagement with said support, by back movement of said annulus, before backward movement of said collar is imparted to said slidable section.

21. A V-belt clutching sheave according to claim 20 wherein said pull pins are fixed to said annulus and extend loosely through said washer and have heads behind the washer, and said pushers consist of sleeves slidably fitted on said pull pins and adapted to abut said annulus and washer when the annulus is in the rearmost position relative to said sliding section.

22. A V-belt clutching sheave according to claim 20 wherein the distance which said annulus is movable relative to said washer is substantially equal to that which it is movable relative to said slidable section and said stud is of a length substantially equal to the minimum distance between said washer and annulus allowed by said pushers.

23. A V-belt clutching sheave according to claim 20 wherein the distance which said annulus is movable axially relative to said washer exceeds that which it is movable relative to said slidable section and said stud is of a length substantially equal to the minimum distance between said washer and annulus allowed by the pushers.

24. A V-belt clutching sheave according to claim 20 wherein the distance which said annulus is movable relative to said slidable section exceeds that which it is movable relative to said washer and said stud is of a length substantially equal to the distance between said washer and abutment when the washer is brought by the pull pins to its foremost position relative to said slidable section.

References Cited in the file of this patent

UNITED STATES PATENTS

| Number | Name | Date |
|---|---|---|
| 759,139 | Temple | May 3, 1904 |
| 2,182,956 | Beyerline | Dec. 12, 1939 |
| 2,259,149 | Cederstrom | Oct. 14, 1941 |

FOREIGN PATENTS

| Number | Country | Date |
|---|---|---|
| 4,660 | Great Britain | 1908 |
| 52,877 | France | Aug. 13, 1945 |
| | (Addition to No. 886,313) | |